Dec. 24, 1929.  F. H. PARKER ET AL  1,740,709
CULINARY MIXER
Filed Nov. 5, 1927   2 Sheets-Sheet 2
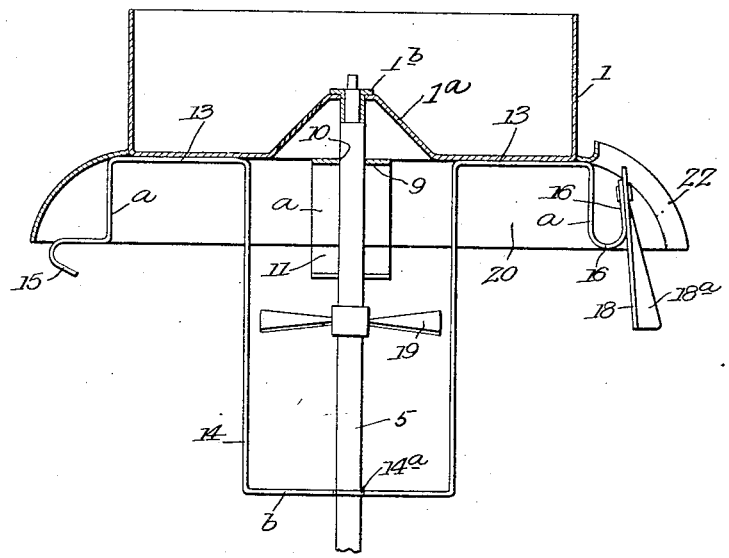
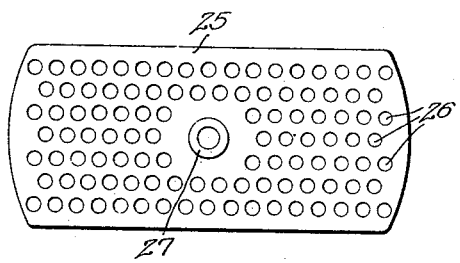
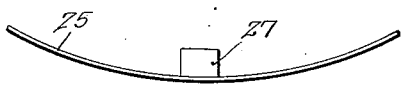
Inventors
Frank H. Parker
Kenneth H. Kolpien
By
Attorney Patented Dec. 24, 1929

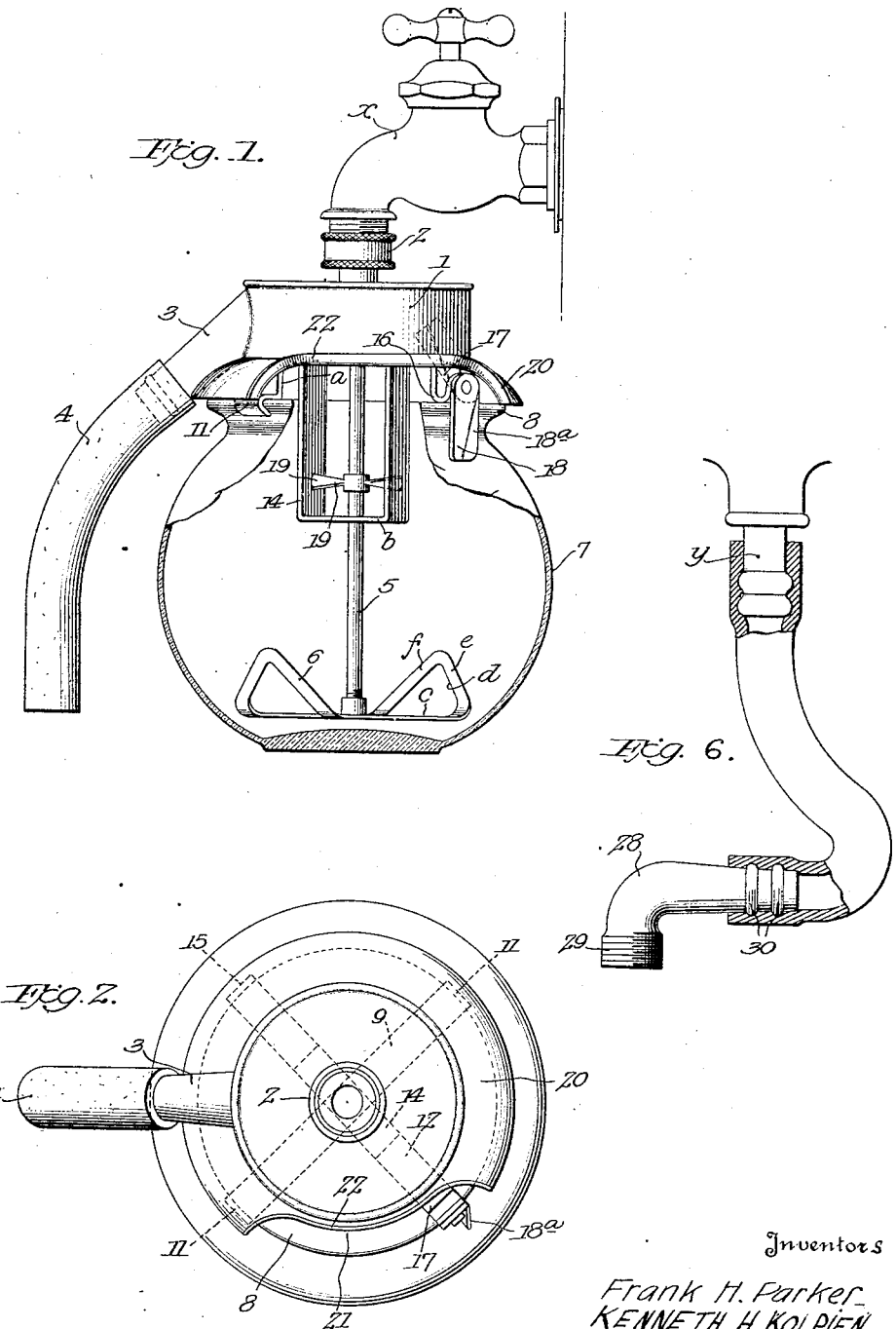

1,740,709

UNITED STATES PATENT OFFICE

FRANK H. PARKER AND KENNETH H. KOLPIEN, OF CLEVELAND, OHIO, ASSIGNORS, BY MESNE ASSIGNMENTS, TO THE NIAGARA MIXER COMPANY, OF CLEVELAND, OHIO, A CORPORATION OF OHIO

CULINARY MIXER

Application filed November 5, 1927. Serial No. 231,280.

The present invention is a stirrer or mixer and has for its object the protection of a thoroughly efficient, practical and convenient fluid operated device of this nature which can be attached to a faucet or other source of fluid pressure, for stirring, beating, whipping and mixing all kinds of food and drink preparations, and is particularly adapted for whipping cream, mixing salad dressing, beating eggs, stirring batter, jello and mixing drinks.

The invention resides in the improved principles and features of construction, combination and arrangement of parts herein described and claimed, producing a device of the above stated character having increased simplicity, durability and utility.

In this specification and the annexed drawings, the invention is disclosed in the form in which it is considered to be the best, but the invention is not limited to such form because it is capable of being embodied in other forms; and it is to be understood that in and by the claims following the description herein, it is intended to cover the invention in whatever form it may embody within the scope thereof.

Referring particularly to the drawings which show the preferred embodiment of the invention as at present devised:

Figure 1 is a side elevation of the improved mixer with parts of the bowl broken away to clearly show operating parts, and illustrating the mixer as applied or suspended from the usual household faucet.

Fig. 2 is a plan view of Fig. 1 with the mixer detached from the faucet.

Fig. 3 is a vertical sectional view taken through the motor casing and illustrating details of construction of the attaching means for the mixing chamber.

Fig. 4 is a plan view of a modified form of agitator and Fig. 5 is an end view of the same.

Fig. 6 is a side elevation of a coupling member to adapt the mixer for connection with other types of faucets or the like.

Like characters denote similar and like parts throughout the specification and drawings, wherein 1 denotes a motor casing of any particular type, preferably a fluid motor, the casing having a coupling or attaching member 2 on its top face and preferably arranged in alinement with the axis of the casing. In the present showing this coupling consists of a threaded sleeve swivelly mounted on the casing and is of such construction as can be attached to the ordinary faucet $x$ or the like. When a fluid motor is used the casing is provided with a discharge outlet 3 upon the outer end of which a flexible tube 4 may be attached to conduct the discharge to any convenient place. The bottom face of the motor casing is closed so as to exclude any water or other fluid used to propel the motor, from the mixing bowl or vessel in which the material to be agitated is contained.

The central portion of the bottom wall of the motor casing is pressed inwardly to form an inwardly extending projection $1^a$ within the casing. The innermost portion of this projection is provided with an aperture in which is disposed a bushing $1^b$ which bushing is in axial alinement with the coupling member 2, and forms one of the bearings for the shaft 5.

The agitator shaft 5 extends downwardly from the interior of the motor casing 1 through the bottom wall thereof for a suitable distance and has suitably and removably attached to its lower end an agitator 6. In the present instance the lower end of the shaft 5 is shown as being threaded and the agitator 6 as having an internally threaded sleeve thereon in which the threaded end of the shaft engages. The longitudinal axis of the shaft 1 is preferably arranged in alinement with the axis of the coupling 2 in order that a proper balance of the device can be obtained.

It is well known that as a liquid is rotated it is thrown by centrifugal force to the sides of the vessel at which point it assumes its greatest density. On account of this fact it has been found that to whip cream by a rotary agitating motion ordinary cylindrical receptacles, such as Mason jars, are not adapted for this purpose, and will not permit cream to be whipped therein, there being required a receptacle which gradually increases in diameter and will permit the liquid thrown out by centrifugal force to rise above the agitator. To provide for this requirement, especially for the whipping of cream, there is provided the spherical bowl 7 and means for quickly detachably securing it to the motor casing and at the same time provide for the ingress of air to the interior of the bowl and to permit the other ingredients to be poured into the bowl during the agitating operation, as is particularly required in the mixing of salad dressing and drinks.

The mixing chamber or bowl 7 is open and the edges of said opening are outwardly flared to form the laterally extending annular flange 8. The bowl 7 is removably held in position beneath the motor casing and concentric with the shaft 5. To this end a strip 9 of suitable material is secured intermediate its ends to the under face of the motor casing, as shown in Fig. 3, and extends diametrically thereof and has an opening 10 therein through which the shaft 5 extends, thus forming a bearing support for the shaft at a point below the bushing 1$^b$. The ends of the strip 9 are extended downwardly as at $a$ for a distance and thence outwardly. The extremities of these strips are then bent inwardly upon themselves to form open loops or clips 11, the clips being spaced apart for a distance substantially that of the diameter of the annular flange 8, in order to receive the flange therebetween. A second strip of suitable material 12 is arranged at right angles to the strip 9 and is secured at points intermediate its ends, as at 13, to the bottom face of the motor casing. The central portion of the strip 12 is offset downwardly as at 14, by a U-shaped formation, which has at its lowermost portion an opening 14$^a$ therein through which the shaft 5 extends, thus forming another bearing support for the shaft. The extent of the offset 14 may be such as will provide a sufficient and proper bearing for the lower portion of the shaft to properly steady the same during its rotation and prevent it from wobbling.

One end portion of the strip 12 is formed identically the same as the end portions 11 of the strip 9 to provide the clip 15, the clip 15 being spaced from the shaft 5 the same distance as are the clips 11. The other end portion of the strip 12 is first bent downwardly as at $a$ from the bottom face of the motor casing and then bent upon itself upwardly as clearly illustrated in the drawing, to provide the abutment surface 16 and the upwardly extending ear 17. The abutment face 16 is spaced from the shaft 12 a proper distance to overlie the annular flange 8 of the mixing bowl 7 and to have the same engage thereagainst.

To the upwardly extending ear 17 is pivotally secured a latch member 18, which when in its latched position will extend below the abutment surface 16 and prevent lateral movement of the mixing jar between the clips 11 and 15, and thereby securely maintain the bowl in position. The latch member is formed of a single piece of sheet material having one side edge outwardly turned to form a single clip or abutment to facilitate its movement. To remove the mixing bowl it is only necessary to raise the latch member 18$^a$ to the dotted line position and to shift the bowl laterally to remove the flange 8 thereof from engagement with the open looped ends of the clips 11 and 15. The bowl is easily attached to and detached from the motor and can be done while the motor is either attached to the faucet or removed.

It will be observed that the downwardly extending portions $a$ of the ends of the strips 9 and 12 space the mouth of the bowl from the bottom of the motor casing in order to allow for the admission of air during the whipping or mixing operations, in order that the material being acted upon can be thoroughly aerated as is particularly required with the whipping of cream. To facilitate the ingress of air to the mixing bowl or chamber a suitable fan or propeller 19 is provided on the shaft 5 to lie just below the opening of the mixing bowl when in position. This propeller will draw in air and force the same downwardly toward the center of the material being mixed. When the propeller 19 is arranged within the U-shaped offset in the brace strip 12 the cross portion $b$ of said offset is suitably perforated to permit the passage of air therethrough; however, it has been found that these perforations may be eliminated.

When the mixer is suspended from a faucet as shown in Fig. 1 it sometimes occurs that a tight connection is not made between the coupling 2 and the faucet, thereby causing leakage. Before this condition can be corrected considerable water may have flowed into the mixing chamber. An outwardly and downwardly skirted flange is provided around the lower periphery of the motor casing to overlie the open end of the bowl 7 in order to shed such leakage or dripping of water over the sides of the bowl 7 and prevent it from entering the mixing bowl. A portion of this flange 20 is cut away, as at 21, at a point adjacent the latch member 18, the edge of this cut away portion being upwardly turned to form a rib or gutter 22. This cut away portion 21 aside from providing sufficient room for the operation of the latch 18 also provides an opening which will permit ingredients to be poured into the bowl 7 during the mixing operation. In the mixing of salad dressings it is practically essential that oils and other ingredients be added during the mixing operation. The open end of the bowl 7 is preferably slightly larger than the diameter of the motor casing and the protecting hood or flange 20 is of greater diameter than the open end of the bowl and is positioned to lie a suitably spaced distance from the flange 8 so as to permit the ingress of air to the bowl 7.

The agitator 6 shown in Figs. 1 and 4 is particularly adapted for mixing ingredients and is of a construction which will produce cross or eddy currents during the stirring or swirling operation, and will cause the ingredients to thoroughly mix. As can be seen particularly from Fig. 1, the agitator 6 is provided with two diametrically opposite blades of identical construction. Each blade consists of a relatively straight lower cutting edge c with the remainder of the blade extending upwardly on an inclination from the said cutting edge, the interior area of the blade being cut away, leaving only a marginal strip forming the blade. These blades may be of any desired outline or shape provided they possess this particular construction, and in the present instance the blades are shown to be of a hollow triangular shape. The result of said construction is that the edge c of the blade, when the shaft 5 is rotated, will advance and cut the material being mixed, the opening d permitting a portion of the material to pass through the blade at a more or less slow speed and the portions e and f of the blade will further cut the material and cause the same to move at a faster rate of speed, and due to their canted or inclined formation will cause the material to be diverted in cross lines, resulting in the thorough mixing of the ingredients.

The agitator shown in Fig. 5 is particularly adapted for the whipping of cream and like materials. This agitator consists of a blade 25 of relatively flat stock curved on an arc to conform substantially with the bottom of the mixing bowl 7. the blade 25 having apertures 26 of any desired form, number or arrangement. A hub 27 is secured to a point intermediate the ends of the blade, the hub being internally threaded to be received on the end of the shaft 5.

A number of faucets now being brought in use take the construction of the faucet y shown in Fig. 6, and to adapt the mixer to these faucets an "adapter" connection 28 is provided, consisting of an elbow threaded at 29 to engage with the coupling 2 and being provided with ribs or corrugations 30 at its other end to receive the end of a flexible pipe. In using this adapter 28 the mixer is not suspended from the faucet but can rest upon the bottom of the sink, board or table, according to the length of the flexible tube 31, which connects the elbow 28 with the faucet y.

From the foregoing it will be clearly seen that the present invention provides a highly desirable and efficient mixer or agitator which is very simple in construction, efficient in operation and economical to manufacture.

While in the foregoing we have shown and described the clips 11 and 15, as being bent from strip material, these grooved or open-loop clips can be provided by suitably grooving any character of material, and it is within the purview of this invention to provide a semi-circular member grooved correspondingly to receive the flange 8, without departing from the spirit of this invention.

Having thus described our invention, what we claim and desire to secure by Letters Patent, is:

1. A mixer of the kind described, comprising a motor casing, a rotor in said casing, an attaching coupling member mounted on one wall of said casing in substantial alinement with the axis of said rotor, and an agitator shaft extending from the rotor through the opposite wall of the casing and in substantial axial alinement with said rotor.

2. A mixer of the kind described, comprising a fluid motor casing, having connected walls providing a closed chamber having an inlet opening in the top face of said casing at the center of the latter and a discharge opening therein, an attaching coupling on the casing at said inlet opening, means on the bottom face of said casing for detachably suspending a mixing chamber therefrom and substantially concentrical with said coupling member, a motor in said casing, and an agitator shaft extending from said motor and projecting into the mixing chamber and in substantial axial alinement with said coupling member whereby the device is supported through said casing walls when supported from said coupling.

3. A mixer of the kind described comprising a motor casing, an agitator shaft extending from said casing through a wall thereof, a motor in said casing and mounted on said shaft to actuate the latter, an attaching coupling member mounted on the opposite wall of said casing in substantial alinement with the axis of said shaft, and an agitator on said shaft.

4. A culinary mixer of the kind described, comprising a motor, a mixing chamber detachably supported from said motor, said mixing chamber having an offset annular rib thereon, and complemental means on the motor adapted to engage said rib so that said motor and mixing chamber may be rigidly held in cooperative position, said means including a pivoted latch positioned to engage the outer surface of said chamber and movable into and out of the plane of said complemental means and of said engaging position, and an agitator operated from the motor.

5. A culinary mixer of the kind described, comprising a motor including a casing therefor having a depression in its bottom face; crossed strips of substantially rigid material secured to the bottom face of said casing and one of said strips bridging said depression and the other being offset at a medial portion and extending from said casing, whereby spaced bearings are provided, an agitator shaft extending from said casing and mounted in bearings on said strips.

6. A culinary mixer of the kind described, comprising a motor including a casing therefor; crossed strips of substantially rigid material secured to the bottom face of said casing, a shaft extending from said casing and projecting through openings in said strips, whereby bearing for said shaft are provided, one of said strips being offset at a medial portion from the other, whereby said bearings are spaced, the ends of said strips being provided with means to engage and maintain the casing in cooperative relation with a mixing bowl.

7. A culinary mixer of the kind described, comprising a motor including a casing therefor; crossed strips of substantially rigid material secured to the bottom face of said casing, a shaft extending from said casing and extending through openings in said strips, whereby bearings for said shaft are provided, one of said strips being offset at a medial portion from the other, whereby said bearings are spaced, the ends of certain of said strips being framed into hook-like members to engage a portion of the mixing bowl, and a pivoted latch member on the end of one of said strips to engage the bowl and lock it in engagement with the hook-like members.

8. A culinary mixer of the kind described, comprising a motor and casing therefor; a mixing chamber having an opening, the edges of said opening being laterally extended, clips secured to said motor casing and extending downwardly therefrom and having their extremities bent upon themselves to form open loops capable of engaging the peripheral edge of said opening, said clips being spaced apart to prevent lateral shifting movement of said chamber relative to said casing except in one direction by which the chamber is attached and detached from said clips, and a movable detent movable into and out of the path of said shifting movement of said chamber, whereby the chamber may be locked in said clips or removed therefrom.

9. The culinary mixer as set forth in claim 8, further characterized by a hood extending from said motor casing over and beyond said mixing chamber to prevent liquid from flowing into said chamber, said hood having a cut-away portion at and adjacent to said detent, whereby the detent may be freely operated and further providing an opening through which ingredients may be poured into the mixing chamber, the edge of said cut-away portion being upturned and forming a gutter.

10. A culinary mixer of the kind described comprising a motor including a motor casing therefor; crossed strips of substantially rigid material secured to the bottom face of said casing, a shaft extending from said casing, the ends of certain of said strips being formed into hook-like members to engage a portion of a mixing bowl, and a pivoted latch member on the end of one of said strips to lock the bowl in engagement with the hook-like members.

11. A culinary mixer of the kind described, comprising a motor including a motor casing therefor, a mixing bowl and a shaft extending from said casing into said mixing bowl, means for connecting the motor casing with the mixing bowl, including strips of substantially rigid material secured to the casing in spaced relation to engage the mixing bowl at intervals partially therearound, said strips being formed with hook-like members to engage and support the mixing bowl, and a movable latch secured to the casing and arranged to engage the mixing bowl at a point between two of said hook-like members, said latch being movable into and out of the plane of said bowl-supporting means, whereby the bowl may be locked in engagement with said supporting means.

12. A culinary beater of the kind described, comprising a motor including a casing therefor; cross strips of substantially rigid material secured to the bottom face of the casing, a shaft extending from the casing and projecting through openings in said strips, one of said strips being offset at a medial portion from the other strip, the ends of said strips being provided with means to engage and maintain the casing in cooperative relation with the mixing bowl.

13. A culinary mixer of the kind described comprising a motor including a casing therefor having a depression in its bottom face; an agitator shaft extending from said casing through said depressed portion; crossed strips of substantially rigid material secured to the bottom face of said casing, one of said strips bridging said depression and the other being offset outwardly at a medial portion from the other and both having openings therein through which said shaft extends.

In testimony whereof we have hereunto set our hands.

FRANK H. PARKER.
KENNETH H. KOLPIEN.